United States Patent [19]

Tsubakimoto et al.

[11] Patent Number: 4,625,001

[45] Date of Patent: Nov. 25, 1986

[54] METHOD FOR CONTINUOUS PRODUCTION OF CROSS-LINKED POLYMER

[75] Inventors: Tsuneo Tsubakimoto; Tadao Shimomura, both of Osaka; Yoshio Irie, Hyogo, all of Japan

[73] Assignee: Nippon Shokubai Kagaku Kogyo Co., Ltd., Osaka, Japan

[21] Appl. No.: 790,819

[22] Filed: Oct. 24, 1985

Related U.S. Application Data

[63] Continuation-in-part of Ser. No. 647,971, Sep. 25, 1984, abandoned.

[51] Int. Cl.$^4$ .............................................. C08F 2/10
[52] U.S. Cl. ...................................................... 526/88
[58] Field of Search .......................................... 526/88

[56] References Cited

U.S. PATENT DOCUMENTS

| | | | |
|---|---|---|---|
| 2,820,777 | 1/1958 | Suen | 260/89.7 |
| 3,784,597 | 1/1974 | Fujimoto | 260/80.3 N |
| 4,172,066 | 10/1979 | Zweigle | 525/157 |

FOREIGN PATENT DOCUMENTS 57034101  11/1980  Japan.

Primary Examiner—Paul R. Michl
Attorney, Agent, or Firm—Omri M. Behr

[57] ABSTRACT

A method for the continuous production of a cross-linked polymer having a low proportion of large particles, comprising the steps of continuously feeding the aqueous solution of a monomer capable of being converted by aqueous solution polymerization into a water-containing cross-linked gel polymer and a polymerization initiator to a vessel provided with a plurality of mutually parallel rotary stirring shafts each fitted with stirring blades, finely dividing a water-containing gel polymer issuing from the polymerization in progress by the shearing force of stirring blades generated by the rotation of said stirring shafts while allowing the radical aqueous solution polymerization to proceed without interruption, and continuously discharging the resultant finely divided water-containing gel polymer out of said vessel.

13 Claims, 7 Drawing Figures

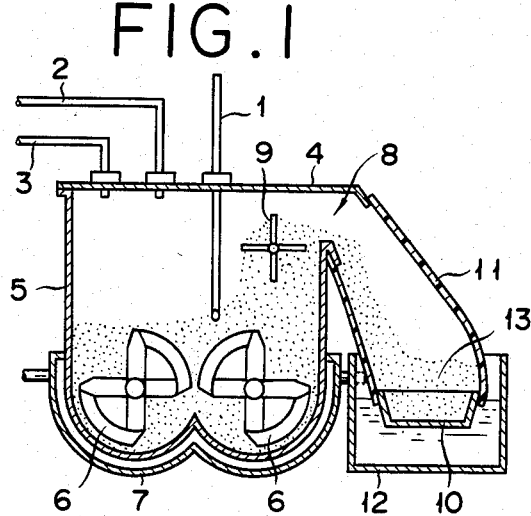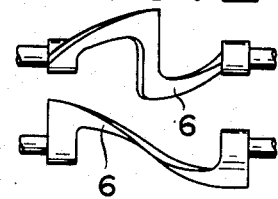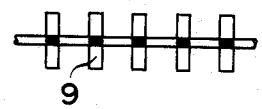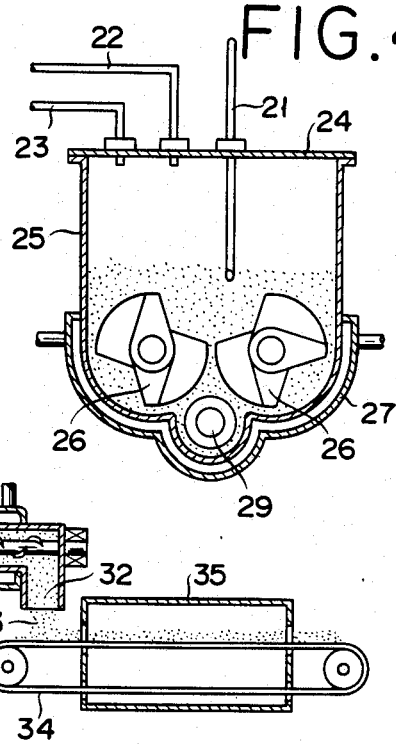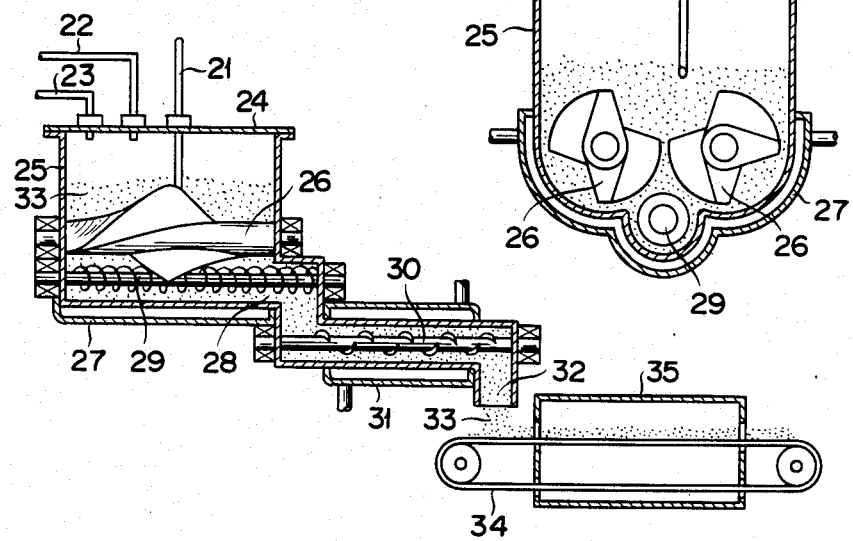

METHOD FOR CONTINUOUS PRODUCTION OF CROSS-LINKED POLYMER

RELATED APPLICATIONS

This application is a continuation-in-part of our application, Ser. No. 647,971, filed Sept. 25, 1984, now abandoned.

BACKGROUND OF THE INVENTION

1. Field of the Invention

This invention relates to a method for the continuous production of a cross-linked polymer. More particularly, this invention relates to a method for the continuous production of a water-containing gel polymer cross-linked by aqueous solution polymerization.

2. Description of the Prior Art

Heretofore, cross-linked polymers using acrylamide, acrylic acid or salts thereof as main components have been known for their ability to absorb and retain large volumes of water, effect ion exchange, and induce chelation and have found extensive utility in various applications as sanitary articles, soil conditioners for agronomic uses, dehydrants, ion-exchange resins and adsorbents. For the production of these cross-linked polymers, the method which comprises polymerizing an aqueous monomer solution as water-in-oil emulsified or suspended in a hydrophobic solvent and the method which comprises cast polymerizing an aqueous monomer solution have found recognition and acceptance. The method of water-in-oil emulsion polymerization and the method of water-in-oil suspension polymerization entail use of large volumes of organic solvent and, therefore, prove highly dangerous from the standpoint of prevention of accidents and pose a serious problem of possible exposure of workers to toxic effects of the organic solvent. The method which relies on the cast polymerization of an aqueous monomer solution is excellent over the two methods described above in the sense that it has no use for any organic solvent. This method nevertheless requires continual removal of heat of reaction during the course of polymerization and inevitably entails use of an intricate and expensive polymerization device. Further, in producing a cross-linked polymer in a dry state from the produced water-containing gel polymer by the removal of the water, there is essentially involved a step of finely dividing the water-containing gel polymer mechanically thereby increasing the surface area of the polymer enough for drying. In this case, the mechanical fine division of the water-containing gel polymer may be accomplished by cutting or extrusion, for example. In either case, the work of fine division of the polymer consumes a high amount of energy because the water-containing gel polymer possesses strong rubbery elasticity.

As a solution to the various problems described above, the inventors have proposed in Japanese Patent Laid-open No. SHO 57(1982)-34101 a method for the batchwise radical aqueous solution polymerization by the use of a vessel provided with a plurality of rotary stirring shafts. Although this method has succeeded in improving productivity and workability to some extent over the conventional methods, it still has much to be desired.

An object of this invention, therefore, is to provide a novel method for the continuous production of the cross-linked polymer.

Another object of this invention is to provide a method for the continuous production of a water-containing gel polymer cross-linked by aqueous solution polymerization.

SUMMARY OF THE INVENTION

The objects described above are accomplished by a method for the continuous production of a cross-linked polymer, which comprises the steps of continuously feeding the aqueous solution of a monomer capable of being converted by aqueous solution polymerization into a water-containing cross-linked gel polymer and a polymerization initiator to a vessel provided with a plurality of mutually parallel rotary stirring shafts, finely dividing a water-containing gel polymer issuing from the polymerization in progress by the shearing force of stirring blades generated by the rotation of the aforementioned stirring shafts, and continuously discharging the resultant finely divided water-containing gel polymer out of the vessel.

BRIEF DESCRIPTION OF THE DRAWINGS

FIG. 1 is a schematic cross-sectional view illustrating a typical reaction device to be used for the method of this invention, FIG. 2 is a front view of stirring blades to be used in the reaction device of FIG. 1, FIG. 3 is a side view illustrating a typical group of discharge blades, FIG. 4 is a schematic cross-sectional view illustrating another typical reaction device to be used for the method of this invention, FIG. 5 is a schematic cross-sectional view illustrating a typical combination of the reaction vessel of FIG. 4 and a heating device and a drier.

DESCRIPTION OF THE PREFERRED EMBODIMENTS

Figure 6A:
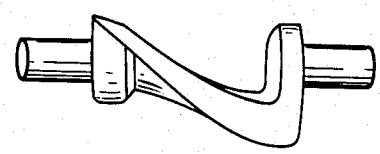
FIG. 6 is a perspective view of stirring blades for use in the reaction devices of FIGS. 4 and 5.
Figure 6B:
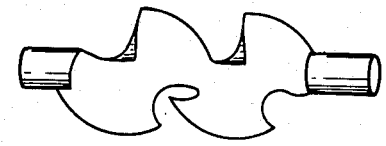
Figure 6C:
Figure 6D:
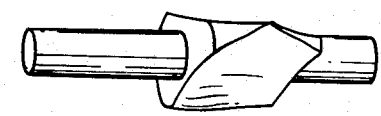

The monomer to be used in this invention is capable of being converted by aqueous solution polymerization into a water-containing cross-linked gel polymer. The cross-linked structure may be that which is obtained by the copolymerization of a water-soluble monomer and a cross-linking monomer possessing at least two polymerizable double-bonds in the molecular unit thereof or that which is obtained by subjecting a water-soluble monomer to aqueous solution polymerization in the presence of a hydrophilic high molecular substance such as starch, cellulose or polyvinyl alcohol and a water soluble poly epoxide compound thereby effecting the polymerization in combination with graft linkage, formation of a complex or ester linkage.

The aqueous monomer solution to be used in this invention is continuously fed into a polymerization vessel and, therefore, is desired to contain the monomer in a concentration of 10 to 80% by weight, preferably 20 to 60% by weight. So long as the concentration falls within this range, the water containing gel polymer formed with the progress of the polymerization can be easily divided finely by the shearing force generated by the rotation of the stirring shafts.

Examples of the water-soluble monomer usable advantageously in the polymerization include $\alpha,\beta$-ethylenically unsaturated monomers such as acrylic acid and methacrylic acid and alkali metal salts and ammonium salts thereof, acrylamide, methacrylamide, acrylonitrile, 2-hydroxyethyl (meth)acrylate, methyl acrylate, ethyl acrylate, isopropyl acrylate, methyl methacrylate, ethyl methacrylate and maleic acid. One member or a mixture of two or more members selected from the group of monomers enumerated above can be used.

Examples of the cross-linking monomer usable advantageously herein include diacrylate or dimethacrylates of ethylene glycol, diethylene glycol, triethylene glycol, propylene glycol, 1,4-butane diol, 1,5-pentanediol, 1,6-hexane diol, neopentyl glycol, trimethylol propane and pentaerythritol; triacrylates or trimethacrylates of trimethylol propane and pentaerythritol; tetracrylates or tetramethacrylates of pentaerythritol; N,N'-methylene-bis-acrylamide, N,N'-methylene-bis-methacrylamide and triallyl isocyanurate. One member or a mixture of two or more members selected from the group mentioned above can be used. The aforementioned cross-linking monomer is used generally in the amount of not more than 10 mol%, more desirably 0.0005 to 5 mol%, and most desirably 0.001 to 1 mol%, based on the aforementioned water-soluble monomer.

Among numerous monomers enumerated above, a monomer mixture of (A) one member or a combination of two or more members selected from the group consisting of acrylic acid, methacrylic acid, alkali metal salts, ammonium salts thereof, acrylamide and methacrylamide and (B) a cross-linking monomer possessing at least two polymerizable double-bonds in the molecular units, with the cross-linking monomer of (B) accounting for not more than 10 mol%, is used particularly desirably. The cross-linking monomer (B) is one member or a mixture of two or more members selected from the group of cross-linking monomers enumerated above. If the amount of the cross-linking monomer (B) to be used exceeds 10 mol%, especially 50 mol% based on the monomer (A), the produced cross-linked polymer is deficient in the ability to absorb water or the ability to effect ion exchange. Thus, the ratio of the cross-linking monomer (B) is in the range of 0.0005 to 5 mol%, preferably 0.001 to 1 mol%. Further, concentration of this aqueous monomer solution is 10 to 80% by weight, preferably 20 to 60% by weight.

Even when the cross-linking monomer (B) is not used at all, the continuous polymerization aimed at by the present invention can be carried out so far as the formation of the cross-linking structure is effected as by the use of ammonium persulfate in a large amount, for example.

The aqueous monomer solution to be used in this invention is continuously fed into a polymerization vessel and, therefore, is desired to contain the monomer in a concentration of 10 to 80% by weight, preferably 20 to 60% by weight. So long as the concentration falls within this range, the water containing gel polymer formed with the progress of the polymerization can be easily divided finely by the shearing force generated by the rotation of the stirring shafts.

The vessel used for this invention is required to be provided with a plurality of rotary stirring shafts and is required to be capable of exerting shearing force generated by the rotation of rotary stirring shafts fitted with stirring blades to bear upon the water-containing gel polymer being formed by the aqueous solution of polymerization of the monomer. The vessel is required to be provided with a plurality of rotary stirring shafts laid parallelly to one another. Examples of the vessel satisfying this requirement include a two-arm type kneader (hereinafter referred to simply as "kneader") and a three-shaft kneader. When the kneader is adopted, the two rotary stirring shafts are rotated in mutually opposite directions at equal or unequal rates. When the two shafts are operated at an equal rate, they may be used in such a sates that the radii of rotation of the two shafts partly overlap. When the two shafts are operated at unequal rates, they are used in such a state that the radii of rotation thereof do not overlap. The rotary stirring shafts to be used herein may be in any of various forms such as sigma type, S type, Banbury type and fish-tail type.

The kneader to be used herein is desired to have the inner surface thereof coated with fluorine containing resin because the coating serves to prevent the formed gel from adhering to the inner surface. Examples of the fluorine containing resin include tetrafluoroethylene resin, tetrafluoroethylene-perfluoropropylvinyl ether copolymer, tetrafluoroethylene-hexafluoropropylene copolymer, trifluoromonochloroethylene resin and ethylene-tetrafluoroethylene copolymer.

The polymerization vessel to be used for this invention is desired to be provided in the upper portion thereof with a lid adapted to permit displacement of the internal gas of the polymerization vessel with an inert gas and, consequently, enable the polymerization system to be retained under an atmosphere inert to the reaction of radical polymerization. Optionally, the polymerization vessel may be provided in the upper portion thereof with a reflux condenser for condensing, during the course of the polymerization, the water vaporized by the heat of polymerization reaction. Otherwise, the polymerization vessel may be adapted so that the water formed as described above will be forced out of the vessel interior by the current of an inert gas introduced into the vessel. For the purpose of heating the aqueous monomer solution or partially removing the heat of polymerization reaction during the polymerization, it is desirable to provide the polymerization vessel with a jacket. Examples of the inert gas usable advantageously herein include nitrogen, carbon dioxide and argon.

Now, the reaction vessel to be used for the method of this invention will be described below with reference to the accompanying drawing. FIG. 1 represents one typical reaction vessel to be used for working this invention. This is a two-arm type kneader comprising a vessel 5 provided with a thermometer 1, a raw material feed tube 2, an inert gas port 3 and a lid 4. Near the bottom portion thereof, the kneader is provided with a plurality of mutually parallel rotary stirring shafts 6 each fitted with sigma type stirring blades as illustrated in FIG. 2. The vessel is kept under an atmosphere of an inert gas. Optionally, the vessel may be provided near the bottom portion thereof with a jacket to be filled with a heat transfer medium for the control of the reaction temperature. The vessel 5 is also provided in the upper portion thereof with a product outlet 8 and, further near the product outlet 8, with a mechanism for discharge of finely divided water-containing gel polymer. The discharge mechanism, for example, may comprise a horizontal shaft disposed above the plurality of rotary stirring shafts of the reaction vessel and one or more paddle-shaped vanes attached to the horizontal shaft as shown in FIG. 1 and FIG. 3. The aforementioned product outlet 8 and a vat 10 are connected to each other with a duct 11 made of synthetic resin such as polyethylene, polypropylene or polyvinyl chloride. The vat 10 is contained in a heating bath.

The polymerization in the device constructed as described above is effected by feeding the aqueous monomer solution containing the water-soluble radical polymerization initiator via the raw material feed tube 2 into the vessel 5 and, at the same time, introducing an inert gas such as nitrogen via an inert gas port 3 into the vessel and displacing the air remaining in the system, and maintaining the temperature of the system at a prescribed level to induce polymerization. As the polymerization proceeds and produces a water-containing gel polymer, the produced polymer is finely divided by the shearing force generated by the rotation of the vanes of the rotary stirring shafts 6 without interrupting the polymerization in progress. Then, the aforementioned feeding of the aqueous monomer solution containing the polymerization initiator is continued to permit continuation of the polymerization and, for the purpose of maintaining the amount of the gel contained in the system substantially at a fixed level, the particles of the water-containing gel polymer are discharged out of the system through the discharge mechanism. Optionally, the discharged water-containing gel polymer is heated within the vat 10 to complete the polymerization still proceeding in the discharged polymer.

FIGS. 4 and 5 illustrate another typical reaction device usable in working the present invention. This is a three-shaft type kneader comprising a vessel 25 provided with a thermometer 21, a raw material feed tube 22, an inert gas port 23 and a lid 24. The vessel is provided near the bottom portion thereof with a plurality of mutually parallel rotary stirring shafts 26 using Banbury type stirring blades as shown in FIG. 5 and further with a discharge screw 29. The vessel is kept under an atmosphere of an inert gas. Optionally, the vessel is provided near the bottom portion thereof with a jacket filled with a heat transfer medium for the control of the reaction temperature. Near the bottom portion of this vessel 25 is further formed a discharge outlet 28. To this discharge outlet 28 is connected a double-paddle feeder 30 which may be optionally provided with a jacket 31. Below the discharge outlet 32 at one end of the double-paddle feeder 30 is disposed a conveying device 34 such as, for example, a belt conveyor. This conveying device 34, when necessary, is provided with a drier 35. The stirring vanes are available in various forms such as are illustrated in FIGS. 6(A)–(D).

The polymerization in the device constructed as described above is effected by feeding the aqueous monomer solution containing the water-soluble radical polymerization initiator via the raw material feed tube 22 into the vessel 25 and, at the same time, introducing an inert gas such as nitrogen via the inert gas port 23 into the vessel to displace the air remaining in the system, and keeping the inner temperature of the vessel at a prescribed level to induce polymerization. When the polymerization proceeds and produces a water-containing gel polymer 33, the polymer 33 is finely divided by the shearing force generated by the rotation of the blades of the rotary stirring shafts 26 without interrupting the polymerization in progress. Further the feeding of the aforementioned aqueous monomer solution containing the polymerization initiator is continued to permit continuation of the polymerization and at the same time for the purpose of maintaining the amount of gel contained in the system substantially at a fixed level, the gel is driven by the discharge screw 29 and forced out of the discharge outlet 28 into the double-paddle feeder 30. The discharged water-containing gel polymer, when necessary, is heated within the feeder 30 to complete the polymerization still proceeding within the polymer. The water-containing gel polymer inside the feeder 30 is discharged through the discharge outlet 32 onto the conveying device 34 and then dried by the drier 35.

Figure 7:
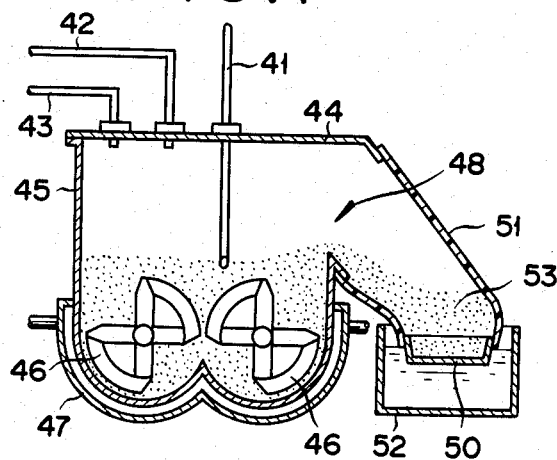
FIG. 7 is a schematic cross-sectional view illustrating yet another typical reaction device.

FIG. 7 illustrates yet another typical reaction device to be used for working this invention. This device is generally similar to the device of FIG. 1, except that the wall on the discharge outlet 48 side of the vessel 45 has a small height enough for the produced water-containing gel polymer to depart from the vessel interior by overflowing the wall. Optionally, this wall of the vessel 45 may be designed as a weir adjustable in height so that it will be intermittently lowered to permit departure of the gel polymer by overflow. The numerical symbols in FIG. 7 which are the sums of the numerical symbols found in FIG. 1 plus 40 denote the same components as those of FIG. 1. The polymerization in this device is carried out by the same procedure as used in the device of FIG. 1.

The term "continuous" as used herein is not required to be interpreted as constant in the exact sense of the word but may be interpreted as portraying the discharge of the produced polymer in a pulsating manner or in an intermittent manner. The discharge of the produced gel polymer has only to be "continuous" in the sense that the amount of the water-containing gel polymer is retained substantially in a fixed level within the reaction vessel.

As the water-soluble radical polymerization initiator to be used for effecting the radical aqueous solution polymerization of the monomer of this invention, any of the water-soluble radical polymerization initiators known to the art may be used. Examples of the polymerization initiator include persulfates, hydrogen peroxide, and water-soluble azo compounds. Such a polymerization initiator may be used alone or used as a redox type initiator in combination with a sulfite, a hydrogen sulfite, a thiosulfate, an L-ascorbic acid or a ferrous salt. The amount of the radical polymerization initiator to be used is in the range of 0.001 to 1% by weight, preferably, 0.005 to 0.5% by weight, based on the total amount of the reactants.

The reaction temperature is variable with the kind of the monomer to be used. When a monomer mixture of (A) one member or a combination of two or more members selected from the group consisting of acrylic acid, methacrylic acid, alkali metal salts, ammonium salts thereof, acrylamide and methacrylamide and (B) a cross-linking monomer possessing at least two polymerizable double-bonds in the molecular unit is used, for example, the reaction temperature falls generally in the range of 60° to 100° C., preferably in the range of 70° to 100° C. When necessary, the polymerization product is subjected to aging at a temperature in the range of 50° to 120° C., preferably 60° C. to 100° C.

When the polymerization is carried out in accordance with the method of this invention, finely divided water-containing gel polymer particles each possessing a cross-linked structure can be continuously produced with ease.

Although the particle diameter of the produced polymer is variable with the reaction conditions actually utilized, the principle advantage of the present process is that the products produced thereby contain a smaller proportion of undesirably large particles than was heretofore possible. The process produces polymer in particle sizes which generally do not exceed diameters of 3 cm and the majority of which have diameters in the range of 0.5 to 1 cm. The process of the present invention produces product wherein the particles exceeding 3 cm in diameter constitute less than 2%, more usually less than 1% by weight of total product.

A further advantage, aside from the principle one of smaller size of the products of the process, is the high absorbancy and low water content of the particles. The absorbancy is expressed as A = (weight after absorbtion minus weight before absorbtion)/weight before absorbtion.

It will be noted that since the process is carried out in an aqueous medium the product should first be dried before absorbancy can be reproduceably measured. It should further be noted that since the process is a continuous one and takes some time to equilibrate, samples taken for the measurement of absorbancy and water content are taken not earlier than 3 hours after the commencement of the continuous process. (It should be noted that this time-lag does not enter into consideration in batch processes). The absorbancy is measured on samples which have been dried in a hot air blast for two (2) hours at 150° C. and is given as $A_1^{150}$. The dried products of the present invention have an $A_1^{150}$ of at least 64 and a water content not exceeding 5% by weight.

This is in contrast to the prior art products produced by the batch processes which have a greater than 3 cm particle size content exceeding 10%, an $A_1^{150}$ of about 42 and a water content after 2 hours of drying of greater than 10%.

In accordance with the method of this invention, since the monomer is continuously fed to the vessel and the produced water-containing gel polymer is continuouly discharged out of the vessel, the method enjoys an extremely high operational efficiency. In contrast to the method for batchwise polymerization which necessitates manual works in the steps of introducing the monomer, causing the polymerization, and discharging the produced polymer, the continuous method of this invention had an advantage that virtually no manual work is required after the reaction has reached its constant state.

Further by the method of this invention, the generation of the heat of polymerization reaction is uniform along the course of time because the finely divided water-containing gel polymer retained within the reaction vessel and the freshly supplied aqueous monomer solution are uniformly mixed and the polymerization of the monomer occurs on the surface of polymer gels. Thus, the removal of the heat of the polymerization reaction and the maintenance of the temperature of the polymerization system at a constant level are easy. Consequently, the rate of polymerization can be increased and the productivity of the polymerization can be enhanced and the maintenance of the product quality at a fixed level is easy to obtain. Unexpectedly, the polymer obtained by the continuous method of this invention exhibits a high ability of absorption as compared with the polymer obtained by the batchwise method. Further, the method of this invention has an effect of producing water-containing gel polymer particles in substantially uniform particle diameters and in a state easy to dry. In the case of the batchwise polymerization, since the heat of polymerization reaction is evolved concentrically, the elimination of the heat is relatively difficult and, as the result, the increase of the rate of polymerization and the enhancement of the productivity of polymerization are difficult to obtain. Moreover, the produced polymer suffers from dispersion of quality and relatively poor ability of absorption. The finely divided water-containing gel polymer particles have widely dispersed particle diameters and some of these particles are not easily dried.

The method of this invention is entirely different in operating principle from the method of Japanese Patent Laid-Open No. SHO 56(1981)-32514 which causes the materials to be moved in the manner of piston flow from the entrance to the exit. The aqueous monomer solution introduced into the vessel is uniformly mixed with the finely divided water-containing gel polymer particles and, in that state, subjected to polymerization and part of the produced polymer is discharged out of the vessel. As the result, the amount of the water-containing gel polymer retained inside the reaction vessel is large for the amount of heat generated. Thus, the removal of the heat is easy.

In contrast, in the case of the method which involves the movement of materials in the manner of piston flow, the removal of heat is difficult. An attempt to enhance the productivity of the polymerization, therefore, has a fair possibility of elevating the temperature of the materials and degrading the quality of the product.

The water-containing gel polymer particles obtained by the method of polymerization of this invention can be used in their unmodified form as adsorbents, water-retaining agents, ion-exchange resins and absorbents. When they are dried, however, they can be handled more conveniently. The water-containing gel polymer particules obtained by the method of polymerization of this invention have an advantage that they can be dried very easily. To be specific, the water-containing gel polymer particles produced by this invention have a large surface area such that they will be quickly and easily dried as by exposure to blast of hot air.

The method of this invention for the continuous polymerization enjoys an advantage that a continuous drier can be effectively utilized in the drying of the product. The device used for the batchwise polymerization necessitates use of a hopper, for example, for the connection of a continuous drier to the device itself. The device of this invention has no use for such extra implement.

In the actual working of this invention, the conversion of the monomer to the polymer can be improved by heating the water-containing gel polymer freshly discharged from the polymerization vessel before the polymer is dried. For this particular embodiment of this invention, union of a continuous heater and a continuous drier may be contemplated.

Now, the method of this invention will be described more specifically below with reference to working examples.

EXAMPLE 1

A jacketed two-arm type stainless steel kneader (hereinafter called "kneader" for short) constructed as illustrated in FIG. 1, having an inner volume of 2 liters, incorporating an opening 160 mm×150 mm, having a depth of 135 mm, and provided with two sigma type stirring blades of a rotational diameter of 70 mm, and having a coating of tetrafluoroethylene-perfluoropropylvinyl ether copolymer formed on surfaces exposed to contact with the solution was fitted with a discharge device and a lid. An aqueous monomer solution containing 399 g of partially neutralized acrylic acid having a 75 mol% portion thereof neutralized with caustic soda, 0.036 g of N,N'-methylene-bis-acrylamide, and 600 g of water was fed into the kneader and nitrogen was blown into the kneader to purge oxygen from of the reaction system. Then the two sigma type stirring blades were rotated at respective rates of 67 and 5 r.p.m. and hot water at 45° C. was circulated through the jacket, and a solution of 0.23 g of 2,2'-azo-bis-(2-amidinopropane)-dihydrochloride (produced by Wako Junyaku Kabushiki Kaisha and marketed under trademark designation V-50) in 10 g of water was added thereto as a polymerization initiator. Polymerization began to proceed 15 minutes after the addition of the polymerization initiator. With the progress of the polymerization, the aqueous monomer solution gave rise to a soft water-containing gel, which was gradually divided finely by the rotation of the stirring shafts. The inner temperature of the reaction system reached 80° C. within 35 minutes of the addition of the polymerization initiator. At this point, the temperature of the hot water circulated to the jacket was raised to 94° C. Then, an aqueous monomer solution containing 14.36 kg of partially neutralized acrylic acid haivng a 75 mol% portion thereof neutralized with caustic soda, 1.3 g of N'N-methylene-bis-acrylamide and 21.6 kg of water and purged of dissolved oxygen by the blowing of nitrogen gas and a solution of 8.2 g of V-50 in 360 cc of water were separately forwarded by constant rate pumps to a mixing tank. The resultant homogeneous mixture was fed into the kneader over a period of 24 hours.

The aqueous monomer solution thus fed cotinuously to the kneader was converted into finely divided water-containing gel polymer and, in that form, continuously discharged by a discharge vane. In this while, the inner temperature of the system was kept substantially constant at 90° C. The discharged water-containing gel polymer was further kept under an atmosphere of nitrogen at 90° C. for 20 minutes to complete the polymerization still proceeding within the polymer.

The discharged water-containing gel polymer was in the form of finely divided particles 2 to 7 mm in diameter. They lacked cohesiveness and enjoyed ease of handling and could be easily dried.

The discharged water-containing gel polymer was spread on a wire gauze of 50 mesh, dried in a hot air drier at 150° C., and then pulverized with a vibrating mill.

A 0.2 g portion of the pulverized product (hereinafter referred to as "absorbent (1)") was evenly placed in a bag (40 mm×150 mm) of non-woven fabric shaped like a tea bag, immersed in a 0.9% saline solution for 10 minutes, removed from the water, and weighed. The absorbency of this specimen was calculated in accordance with the following formula, using as a blank the bag lacking its content.

$$\text{Absorbency} = \frac{\text{Weight after absorption (g)} - \text{blank (g)}}{\text{Weight of absorbent (g)}}$$

The results shown in Table 1. The data given in the table represent the absorbency obtained of the pulverized products from the lots of water-containing gel polymer sampled at intervals of three hours from the start of the continuous supply of the aqueous monomer solution.

TABLE 1

| Time elapsed | 0 | 3 | 6 | 9 | 12 | 15 | 18 | 21 | 24 |
|---|---|---|---|---|---|---|---|---|---|
| Absorbency | 66 | 70 | 72 | 70 | 71 | 71 | 69 | 71 | 71 |

From the data, it is noted that the cross-linked polymer obtained by the method of this invention was effectively usable as absorbent.

EXAMPLE 2

A jacketed stainless steel three-shaft kneader (hereinafter called "kneader" for short) constructed as illustrated in FIGS. 4 and 5, having an inner volume of 10 liters, incorporating an opening 240 mm×220 mm, having a depth of 260 mm and provided with two Banbury type stirring blades of a rotational diameter of 110 mm and one discharge screw 35 mm in diameter had a coating of trifluoromonochloroethylene resin formed on the inner surface thereof. This kneader was fitted with a nitrogen inlet tube, a monomer inlet tube and a thermometer.

An aqueous monomer solution containing 1995 g of partially neutralized acrylic acid having a 75 mol% portion thereof neutralized with caustic soda, 3.3 g of trimethylol propane triacrylate and 3000 g of water was fed into the kneader and nitrogen gas was blown into the kneader to purge oxygen from the reaction system. Then, the Banbury stirring blades were rotated to a rate of 30 r.p.m., hot water at 40° C. was circulated to the jacket, and 2.25 g of ammonium persulfate and 2.25 g of sodium hydrogen sulfite were added thereto as polymerization initiators. Polymerization began to proceed 15 minutes after the addition of the polymerization initiators. With the progress of the polymerization, the aqueous monomer solution gave rise to a soft water-containing gel. By the rotation of the stirring shafts, the soft water-containing gel was gradually divided finely. The inner temperature of the reaction system rose to 90° C. within 25 minutes of addition of the polymerization initiators. At this point, the temperature of the hot water circulated to the jacket was raised to 87° C. Then, an aqueous monomer solution containing 359 kg of partially neutralized acrylic acid having a 75 mol% portion thereof neutralized with caustic soda, 594 g of trimethylolpropane triacrylate, and 540 kg of water and purged of dissolved oxygen by the blowing of nitrogen gas, a solution of 405 g of ammonium persulfate in 10 kg of water and a solution of 405 g of sodium hydrogen sulfite in 10 kg of water were supplied to the over a period of 5 days. After the start of the addition of the monomer, the rotation of the discharge screw was controlled so that the amount of the water-containing gel polymer retained within the kneader would become constant.

The aqueous monomer solution continuously fed into the kneader was converted into a finely divided water-containing gel polymer and, in that form, continuously discharged out of the kneader. In this while, the inner temperature of the system was substantially constant at about 83° C.

The water-containing gel polymer discharged by the rotation of the discharge screw was led into a double paddle feeder (made by Kabushiki Kaisha Nara Kikai Seisakusho) heated by a jacket filled with hot water at 90° C. and heated therein for an average retention time of 15 minutes. The water-containing gel polymer discharged from the paddle feeder was dried with a blast of hot air at 160° C. within a continuous through-circulation band drier. The dried polymer thus obtained was sampled at intervals of one half day. Each test specimen was pulverised and the pulverised product (hereinafter referred to as "absorbent (2)") was tested for absorbency. The results are shown in Table 2.

TABLE 2

| Number of days elapsed | 0.5 | 1 | 1.5 | 2 | 2.5 | 3 | 3.5 | 4 | 4.5 | 5 |
|---|---|---|---|---|---|---|---|---|---|---|
| Absorbency | 65 | 66 | 65 | 65 | 65 | 64 | 65 | 66 | 66 | 65 |

From the data, it is noted that the absorbent (2) was also an excellent absorbent.

EXAMPLE 3

For visual observation of the behavior of the continuously added aqueous monomer solution, 5 cc of the deaerated aqueous monomer solution containing 0.2 g of fluorescent pigment in pink color (made by Nippon Shokubai Kagaku Kogyo Co., Ltd. and marketed under trademark designation of "Epocolor") and the initiator was added to the polymerization system during the course of the continuous polymerization of Example 1 and placed under visual observation.

When the colored aqueous monomer solution was added, the entire system assumed a pink color. This fact evinces that the aqueous monomer solution was uniformly mixed with the crushed water-containing gel polymer and was caused to form a thin coat on the surface of the water-containing gel polymer.

When the uncolored aqueous monomer solution was further added to continue the polymerization there were produced water-containing gel polymer particles pink at the cores and transparent in the outer parts. This fact evinces that the water-containing gel polymer was pulverized within the kneader, the aqueous monomer solution deposited on the surface of crushed polymer and underwent polymerization in that state, the gel particles therefore gained in particle diameter, and the grown particles were again pulverized, and this procedure repeated.

EXAMPLE 4

The kneader used in Example 1 was modified to a construction of FIG. 7 by having a section 150 mm×50 mm cut off the upper portion of one wall thereof to facilitate the overflow of the water-containing gel polymer.

The kneader was fitted with a lid. An aqueous monomer solution (35% by weight of concentration) containing 250 g of acrylamide, 97 g of potassium acrylate, 3 g of N,N'-methylene-bis-acrylamide and 650 g of water was fed to the kneader and nitrogen gas was blown in the kneader to purge oxygen from the reaction system. Then, the two sigma type stirring blades were rotated at respective rates of 44 and 24 r.p.m., hot water at 40° C. was circulated to the jacket to heat the kneader, and 0.5 g of an aqueous 35% hydrogen peroxide solution and 0.006 g of L-ascorbic acid were added as polymerization initiators thereto. Polymerization began to proceed one minute after the addition of the polymerization initiators. With the progress of the polymerizaiton, the aqueous monomer soluiton gave rise to a soft water-containing gel. The gel was gradually divided finely by the rotation of the stirring shafts. Within 15 minutes of the addition of the polymerization initiators, the inner temperature of the reaction system reached 64° C. and the water-containing gel polymer was divided finely into particles about 3 mm in diameter. At this point, the temperature of the hot water circulated to the jacket was raised to 90° C. Then, an aqueous monomer solution containing 12 kg of acrylamide, 4.66 kg of potassium acrylate, 144 g of N,N'-methylene-bis-acrylamide and 29.2 kg of water and purged of dissolved oxygen by blowing nitrogen gas, a solution of 24 g of an aqueous 35% hydrogen peroxide solution in 1 kg of water, and a solution of 0.288 g of L-ascorbic acid in 1 kg of water were separately forwarded by constant rate pumps to a mixing tank, there to be uniformly mixed. The resultant uniform mixture was supplied to the kneader over a period of 24 hours.

The aqueous monomer solution thus continuously fed to the kneader was converted into a finely divided water-containing gel polymer and, in that state, was allowed to overflow the shorter wall and depart continuously from the kneader. In this while, the inner temperature of the system was kept substantially constant at about 85° C.

The discharged water-containing gel polymer was further kept in an atmosphere of nitrogen at 85° C. for 20 minutes to complete the polymerization which was still in progress in the polymer. The discharged water-containing gel polymer was in the form of particles divided finely to the order of 1 to 5 mm in diameter. The particles lacked cohesiveness and enjoyed ease of handling and could be easily dried. The water-containing gel polymer was spread on a wire gauze of 50 mesh and dried with blast of hot air at 180° C. for one hour. The dried product (hereinafter referred to as "water-retainer (1)") was in a granular form and had a water content of 5% by weight.

A 0.5-g portion of the water-retainer (1) was mixed with 100 g of silica sand, No. 7. The mixture was spread on a wire gauze of 100 mesh, wetted with tap water until saturation, left standing under the conditions of 20° C. and 65% RH, and tested for water retaining capacity along the course of time. The change in the amount of water retained by the mixture is shown in Table 3.

TABLE 3

| Number of days of standing | 0 | 2 | 4 | 6 | 8 |
|---|---|---|---|---|---|
| Mixture of water-ratainer with sand | 80 g | 51 g | 36 g | 20 g | 15 g |
| Sand alone | 30 g | 9 g | 1 g | 0 g | 0 g |

From the data, it is noted that the cross-linked polymer obtained by the method of this invention is effectively usable as a water-retainer.

EXAMPLE 5

A jacketed two-arm type stainless steel kneader (hereinafter called "kneader" for short) having an inner volume of 850 liters, incorporating an opening 950 mm×850 mm, having a depth of 650 mm, and provided with two sigma type stirring blades of a rotational diameter of 270 mm, and having a coating of tetrafluoroethylene-perfluoropropylvinylether copolymer formed on surfaces exposed to contact with the solution was fitted with a discharge device and a lid. An aqueous monomer solution containing 140 kg of partially neutralized acrylic acid having a 75 mol% portion thereof neutralized with caustic soda, 50 g of N,N'-methylene-bis-acrylamide, and 240 kg of water was fed into the kneader and nitrogen was blown into the kneader to purge oxygen from of the reaction system. Then the two sigma type stirring blades were rotated at rates of 30 r.p.m. and hot water at 40° C. was circulated through the jacket, and a solution of 92 g of anmonium persulfate in 1 kg of water and a solution of 21 g of sodium bisulfite in 1 kg of water were added thereto as a polymerization initiator. Polymerization began to proceed within 10 minutes after the addition of the polymerization initiator. With the progress of the polymerization, the aqueous monomer solution gave rise to a soft water-containing gel, which was gradually divided finely by the rotation of the stirring shafts. The inner temperature of the reaction system reached 103° C. within 35 minutes of the addition of the polymerization initiator. At this point, the temperature of the hot water circulated to the jacket was raised to 94° C. Then, an aqueous monomer solution containing 4,416 kg of partially neutralized acrylic acid haivng a 75 mol% portion thereof nuetralized with caustic soda, 1.38 kg of N'N-methylene-bis-acrylamide and 6,624 kg of water and purged of dissolved oxygen by the blowing of nitrogen gas and a solution of 2.5 kg of anmonium persulfate in 20 kg of water were separately forwarded by constant rate pumps to a mixing tank. The resultant homogeneous mixture was fed into the kneader over a period of 24 hours.

The aqueous monomer solution thus fed continuously to the kneader was converted into finely divided water-containing gel polymer and, in that form, continuously discharged by a discharge vane. In this while, the inner temperature of the system was kept substantially constant at 90° C. Amount of the discharged water-containing gel polymer was 185 kg/hr as solid content.

The discharged water-containing gel polymer was in the form of finely divided particles 2 to 7 mm in diameter. Further, amount of the water-containing gel polymer having at least 3 cm of diameter was 1% by weight. They lacked tackiness and enjoyed ease of handling and could be easily dried.

1 kg of the discharged water-containing gel polymer was spread uniformly on a wire gauze of 50 mesh, dried in a hot air drier at 150° C., water content after 2 hours drying was 4.9% by weight, and then pulverized with a vibrating mill.

A 0.2 g portion of the pulverized product (hereinafter referred to as "absorbent (3)") was evenly placed in a bag (40 mm × 150 mm) of non-woven fabric shaped like a tea bag, immersed in a 0.9% saline solution for 10 minutes, removed from the water, and weighed. The absorbency of this specimen was calculated in accordance with the following formula, using as a blank the bag lacking its content.

$$\text{Absorbency} = \frac{\text{Weight after absorption (g)} - \text{blank (g)}}{\text{Weight of absorbent (g)}}$$

The results were shown in Table 1. The data given in the table represent the absorbency obtained of the pulverized products from the lots of water-containing gel polymer sampled at intervals of three hours from the start of the continuous supply of the aqueous monomer solution.

TABLE 4

| Time elapsed | 0 | 3 | 6 | 9 | 12 | 15 | 18 | 21 | 24 |
|---|---|---|---|---|---|---|---|---|---|
| Absorbency | 43 | 58 | 64 | 62 | 64 | 65 | 64 | 64 | 66 |

From the data, it is noted that the cross-linked polymer obtained by the method of this invention was effectively usable as absorbent.

EXAMPLE 6

A jacketed two-arm type stainless steel kneader (hereinafter called "kneader" for short) having an inner volume of 850 liters, incorporating an opening 950 mm × 850 mm, having a depth of 650 mm, and provided with two sigma type stirring blades of a rotational diameter of 270 mm, and having a coating of tetrafluoroethylene-perfluoropropylvinylether copolymer formed on surfaces exposed to contact with the solution was fitted with a lid. An aqueous monomer solution containing 140 kg of partially neutralized acrylic acid having a 75 mol% portion thereof neutralized with caustic soda, 50 g of N,N'-methylene-bis-acrylamide, and 240 kg of water was fed into the kneader and nitrogen was blown into the kneader to purge oxygen from of the reaction system. Then the two sigma type stirring blades were rotated at rates of 30 r.p.m. and hot water at 40° C. was circulated through the jacket, and a solution of 92 g of anmonium persulfate in 1 kg of water and a solution of 21 g of sodium bisulfite in 1 kg of water were added thereto as a polymerization initiator. Polymerization began to proceed within 10 minutes after the addition of the polymerization initiator. With the progress of the polymerization, the aqueous monomer solution gave rise to a soft water-containing gel, which was gradually divided finely by the rotation of the stirring shafts. The inner temperature of the reaction system reached 103° C. within 35 minutes of the addition of the polymerization initiator. At this point, the temperature of the hot water circulated to the jacket was raised to 94° C.

After 30 minutes, the water-containing gel polymer was removed from the kneader by overturning. The amount of the water-containing gel polymer having at least 3 cm of diameter was 12% by weight. 1 kg of the water-containing gel polymer was spread uniformly on a wire net having 50 mesh and dried by passing a hot air of 150° C. The water content of the gel polymer after 2 hours was 10.7% by weight. Further, the drying was continued for 1 hour to obtain 5.1% by weight of water content. The dried gel polymer was subjected to absorbency test by a similar method to Experiment I and absorbencey was 42.

We claim:

1. A method for the continuous production of a cross-linked polymer having a content of particles greater than 3 centimeters in diameter not exceeding 2% by weight of the particles produced, comprising the steps of continuously feeding the aqueous solution of a monomer capable of being converted by aqueous solution polymerization into a water-containing cross-linked gel polymer and a polymerization initiator to a vessel provided with a plurality of mutually parallel rotary stirring shafts each fitted with stirring blades, finely dividing a water-containing gel polymer issuing from the polymerization in progress by the shearing force of stirring blades generated by the rotation of said stirring shafts while allowing the radical aqueous solution polymerization to proceed without interruption, and continuously discharging the resultant finely divided water-containing gel polymer out of said vessel.

2. A method according to claim 1, wherein the concentration of said monomer in said aquoeus solution is in the range of 10 to 80% by weight.

3. A method according to claim 1, wherein said vessel provided with a plurality of rotary stirring shafts is a two-arm type kneader.

4. A method according to claim 1, wherein said vessel provided with a plurality of rotary stirring shafts is provided with a plurality of mutually parallel rotary stirring shafts each fitted with stirring blades and a discharge screw.

5. A method according to claim 3, wherein said formed water-containing gel polymer is continuously discharged from said vessel by the rotation of paddle-shaped vanes disposed near the discharge outlet of said vessel.

6. A method according to claim 3, wherein said formed water-containing gel polymer is allowed to overflow a weir disposed near the discharge outlet of said vessel and depart continuously from said vessel.

7. A method according to claim 1, wherein said water-containing gel polymer continuously discharged from said vessel is subjected to after-heating.

8. A method according to claim 1, wherein said monomer comprises an $\alpha,\beta$-ethylenically unsaturated monomer and not more than 10 mol% of a cross-linking monomer.

9. A method according to claim 1, wherein said monomer comprises (A) one member or a combination of two or more members selected from the group consisting of acrylic acid, methacrylic acid, alkali metal salts, ammonium salts thereof, acrylamide and methacrylamide and (B) a cross-linking monomer possessing at least two polymerizable double-bonds in the molecular unit.

10. A method according to claim 9, wherein the concentration of said monomer in said aqueous solution is in the range of 20 to 60% by weight.

11. A method according to claim 9, wherein the ratio of said cross-linking monomer of (B) to said $\alpha,\beta$-ethylenically unsaturated monomer of (A) is in the range of 0.0005 to 5 mol%.

12. A method according to claim 9, wherein said reaction is carried out at a temperature in the range of 60° to 110° C.

13. A method for the continuous production of a cross-linked polymer, having an absorbency ($A_1^{150}$) of at least 64 and a water content of not more than 5% by weight when dried for two hours at 150° C. comprising the steps of continuously feeding the aqueous solution of a monomer capable of being converted by aqueous solution polymerization into a water-containing cross-linked gel polymer and a polymerization initiator to a vessel provided with a plurality of mutually parallel rotary stirring shaft each fitted with stirring blades, finely dividing a water-containing gel polymer issuing from the polymerization in progress by the shearing force of stirring blades generated by the rotation of said stirring shafts while allowing the radical aqueous solution polymerization to proceed without interruption, and continuously discharging the resultant finely divided water-containing gel polymer out of said vessel.

* * * * *